US005540795A

United States Patent [19]

Franklin et al.

[11] Patent Number: 5,540,795

[45] Date of Patent: Jul. 30, 1996

[54] LABEL APPLICATOR

[75] Inventors: Richard D. Franklin, Germantown; Robert Franklin, Memphis; Robert H. McQuage, Memphis; Terrence D. Watson, Memphis, all of Tenn.

[73] Assignee: PTI, Inc., Memphis, Tenn.

[21] Appl. No.: 328,445

[22] Filed: Oct. 25, 1994

Related U.S. Application Data

[63] Continuation-in-part of Ser. No. 161,686, Dec. 2, 1993, Pat. No. 5,435,862, which is a continuation of Ser. No. 772,485, Oct. 7, 1991, abandoned.

[51] Int. Cl.[6] .................... B32B 31/00

[52] U.S. Cl. .................... 156/64; 156/350; 156/384; 156/542; 156/556; 271/31; 271/91

[58] Field of Search .................... 156/64, 277, 350, 156/361, 384, 540, 541, 542, 556; 271/31, 91, 94

[56] References Cited

U.S. PATENT DOCUMENTS

| | | | |
|---|---|---|---|
| 3,729,362 | 4/1973 | French et al. | 156/542 |
| 3,769,139 | 10/1973 | Woods | 156/358 |
| 4,025,382 | 5/1977 | Del Rosso | 156/497 |
| 4,089,725 | 5/1978 | Crankshaw et al. | 156/299 |
| 4,210,484 | 7/1980 | Crankshaw et al. | 156/542 |
| 4,255,220 | 3/1981 | Kucheck et al. | 156/285 |
| 4,367,118 | 1/1983 | Karp | 156/497 |
| 4,468,274 | 8/1984 | Adachi | 156/320 |
| 4,561,921 | 12/1985 | Treiber | 156/297 |
| 4,595,447 | 6/1986 | Lindstrom | 156/364 |
| 4,787,953 | 11/1988 | Trouteaud et al. | 156/387 |
| 4,844,771 | 7/1989 | Crankshaw et al. | 156/387 |
| 4,895,614 | 1/1990 | Trouteaud et al. | 156/542 |

*Primary Examiner*—David A. Simmons
*Assistant Examiner*—Paul M. Rivard
*Attorney, Agent, or Firm*—Pravel, Hewitt, Kimball & Krieger

[57] ABSTRACT

The label applicator for applying a label to an article. The label includes a first side having printed matter visible thereon and including a second side having a pressure sensitive adhesive thereon. The label applicator includes plasma coated tray the defines a label support structure for supporting the label with the second side of the label resting on the label support structure. A label transfer pad structure is provided with an array of openings thereon that have a vacuum source communicating therewith for gripping the first side of the label, picking up the label from the plasma coated tray, and for pressing the label onto the article. The plasma coated tray gives a non stick surface that will not readily retain the adhesive side of the label. The label transfer pad has a suction cup portion for insuring complete separation of the label and any release liner. The label transfer pad has blow-off openings connected to a source of pressurized air for aiding in a complete attachment of the label to even irregularly shaped articles (e.g., cylinders).

63 Claims, 7 Drawing Sheets

LABEL APPLICATOR

CROSS REFERENCE TO RELATED APPLICATION

This is a continuation-in-part of U.S. patent application Ser. No. 08/161,686, filed Dec. 2, 1993, now U.S. Pat. No. 5,435,862 which is a continuation of 07/772,485, filed Oct. 7, 1991, now abandoned, both incorporated herein by reference.

BACKGROUND OF THE INVENTION

1. Field of the Invention

The present invention relates, in general, to apparatuses for printing pressure sensitive labels and attaching the printed labels to articles.

2. General Background

There are numerous products with packaging having printed label material that is affixed to the product after its manufacturer. One example is a bar code label that can contain price information, inventory control and the like. While many products contain such labels on the package as manufacture, there are certain products that receive adhesive labels after manufacture. One example of such a product is a palletized shipping container. Shipping containers are frequently constructed of an underlying pallet that contains numerous boxes or bags of product for shipment to the end user. These products are held to the pallet by a cardboard upper or by shrink wrap plastic film for cost and inventory purposes, it is desirable to place labels on these palletized products as they are conveyed along a moving conveyor in the factory. Other containers that require bar code or like labelling include generic cardboard boxes and cylindrical cans as examples.

Many of these types of products are bulky and have required labor intensive manual application of labels thereto at great expense. Further, many of these packages are stacked and stored in warehouses so that the orientation of the package frequently hides labels that have information needed for pricing, inventory and the like. Therefore, in many instances it is important to affix multiple labels to a package such as for example on a front or rear surface of the package and/or on either side of the package.

Several patents have issued which relate generally to the application of adhesive labels to articles. As an example, French, U.S. Pat. 3,729,362 issued Apr. 24, 1973, discloses a labeling machine including a supply reel and a take up reel. Labels are adhesively secured to a backing strip and the backing strip is wound on the supply reel. The backing strip and labels are moved from the supply reel toward the take up reel and the labels are peeled off of the backing strip and momentarily retained at a first station. An applicator transfers the label to an adjacent article.

U.S. Pat. No. 3,769,139, issued Oct. 30, 1973 to Woods discloses a labeler in which labels, coated with pressure sensitive adhesive and carried by a web of release paper having formed therein feed sprocket holes, are drawn along a predetermined path through a print station and about a sharp reverse bend by a feed drum having disposed about the periphery thereof drive pins spaced to correspond to the spacing of the feed sprocket holes in the web of release paper. The feed drum is in turn driven by a solenoid actuated ratchet feed and may be readily replaced by other feed drums having drive pins spaced to correspond with the feed holes on webs of other sizes of labels. As the release paper is drawn about the sharp reverse bend, the label projects outwardly and a hammer, solenoid actuated in timed relationship with the label feed, is driven against the label to slap the label against an article.

The Del Rosso U.S. Pat. No. 4,025,382 discloses an apparatus for applying a label to an article while the article is being transported along a path of travel by a conveyor. The apparatus includes a vertically movable applicator foot operable to pickup a label from a source and apply such label to the surface of an article, and a vertically movable compressor foot operable to engage the applied label to cause it to conform to the contour of the article surface. The applicator foot and compressor foot are independently supported for conjunctive movements with the article in the direction of conveyor travel, while operably engaged therewith.

U.S. Pat. No. 4,089,725, issued to Crankshaw discloses an apparatus for transferring labels to articles which are moved in a first direction through a station. The apparatus releasably retains first and second labels at first and second positions with the positions defining a row at the station. The axis of the row extends generally in the first direction and the first position being downstream in the direction of article movement of the second position. The first and second labels are transferred from to first and second articles, respectively, as the first and second articles are moved through the station.

The Crankshaw U.S. Pat. No. 4,210,484 discloses a label applicator adapted for use with labels which are provided in a plurality of rows extending longitudinally on a backing strip. The label applicator includes a label dispenser for peeling the labels form the backing strip with the labels moving in a first direction off of the backing strip to provide at least first and second labels at a label dispensing station. A label separator receives the first and second labels and separates them in a direction generally transverse to the first direction to increase the distance between the first and second labels. The separated labels are then transferred to at least one article.

U.S. Pat. No. 4,255,220, issued to Kucheck discloses a label applicator including a label receiver mounted on supporting structure for movement between a retracted position and an extended position. A label dispenser supplies a label to the label receiver when the label receiver is in the retracted position. The label is releasably retained on the label receiver. The label receiver is then moved to the extended position where the label is transferred by an air blast from the label receiver to an article.

U.S. Pat. No. 4,367,118, issued to Karp discloses a label applicator for seizing a printed, adhesive backed label and for applying the label to a commodity. The applicator includes a pickup head for vacuum-seizing a portion of the label by its non-adhesive side and for swinging the label to a label transfer station. At the latter station, the pick-head releases its grip on the label and an applicator head vacuum-seizes another portion of the non-adhesive side of the label and then applies the label to the commodity.

The Treiber U.S. Pat. No. 4,561,921, discloses a label applicator device that receives a label from a label printer and applies the label to a package by means of pressure-sensitive adhesive which coats one side of the label. The applicator device includes a label support means which receives a label with the adhesive coated side facing upward. The label support means includes pair of fingers upon which the label rests. A label transfer nozzle is pivoted about a horizontal axis beneath the label support means into a first position in which it is received between the pair of fingers and engages the printed side of the label by means of a partial vacuum supplied through a vacuum port in the transfer nozzle. The transfer nozzle is then pivoted into a second position in which the adhesive coated side of the label is facing generally downward. The applicator device includes an applicator head which moves downward, removing the label from the transfer nozzle and pressing it into contact with the surface of a package.

The Linstrom U.S. Pat. No. 4,595,447 discloses an article labeling machine including a bell-shaped vacuum foot that subtends from a vertically extending tube to receive a printed label in a first orientation from the label dispenser which is located to one side of and at a higher elevation than a conveyor which is transporting articles to be labeled. The label carrying vacuum foot is moved laterally away from the dispenser through a downwardly smoothly curving diagonal path devoid of any abrupt directional changes. If required, the tube is simultaneously operated to rotate the label into a preselected second orientation as it is being lowered upon the article to be labeled.

The Trouteaud U.S. Pat. Nos. 4,787,953, 4,895,614 disclose label transfer apparatus including a label transfer arm having a central axis and comprising a socket body with a transfer nozzle rotatably mounted therein for engaging labels delivered to a label pickup station and for transferring them to a label delivery station. An applicator head strips the labels from the transfer arm and moves them along a fixed path from the label delivery station to a package labeling station to apply the labels to packages. Transfer arm guiding rails are positioned on either side of the label transfer arm for engaging an eccentric collar attached to the transfer nozzle to thereby orient the transfer nozzle into a fixed angular orientation about the central axis of the transfer arm when the transfer arm is at the label delivery station. An operator-controllable selector ring is rotatably mounted to the socket body of the arm and is freely rotatable between selected locations defined by detents. By selecting the angular orientation of the arm at the label pickup station and forcing the arm into a fixed angular orientation at the label delivery station, a label held by the transfer arm is rotated about the central axis of the arm by an angle equal to the difference between the selected angular orientation and the fixed angular orientation.

The Crankshaw U.S. Pat. No. 4,884,771 discloses a label applicator including a support structure in predetermined relationship with a labeling station at which to apply a label to an article. A label dispenser mounted on the support structure dispenses a label to be applied to the article and a receiver movably mounted on the support structure transports the label from the dispenser to the labeling station. Receiver mounting components are provided for mounting the receiver on the support structure both to enable generally linear movement of the receiver along a path between a retracted position adjacent the dispenser and an extended position adjacent the labeling station, and to enable pivotal movement of the receiver about a pivot axis between a label-receiving position in which the label receiver can receive a label from the dispenser and a label-applying position in which the label can be transferred from the label receiver to a face of an article at the labeling station. Label retaining components releasably retain the label on the receiver so that the label can be transported by the receiver to the labeling station for application to the face of the article.

SUMMARY OF THE INVENTION

The present invention is provide an improved label applicator for receiving for applying a printed, adhesive backs label to an article. The applicator of the present invention is for use with labels that include a first side having printed matter visible thereon and including a second side having a pressure sensitive-adhesion thereon.

The label applicator of the present invention includes, a label support or tray for supporting the label after receiving same from the label printer. The adhesive side of the label rests on the label support.

A label pickup pad picks up the label from the label support or tray and presses the label to a selected side of the box, container, package, or like article.

One object of the present invention is to provide a label applicator that will engage and hold a pressure-sensitive label at the non-adhesive printed side after the label has been discharged from the output port of a label printer, even after any backing or release liner has been stripped from the sticky adhesive side of the label.

Other features of the present invention include the use of a tray that has an adhesive resistant coating thereon so that the label can be placed on the tray with the adhesive side down and without an aggressive connection being formed between the adhesive and the tray. In the preferred embodiment, the tray is provided with a nickel chrome "plasma" coating that can be applied to the aluminum plate that forms the tray. Such coatings are available from Plasma Coatings, Inc. of Waterbury, Conn. and Memphis, Tenn.

The label pickup pad can be optionally supplied with a feature for aiding in the separation of the label from the pad when the label is to be applied to an irregularly shaped article, such as for example, an article with a curved side, for example cylinder.

In one embodiment, the present invention provides a "flapper" arrangement that includes a pivot hinge for joining a moving plate to the machine frame. The moving plate "flaps" between first and second positions that are for example about ninety degrees (90°) apart. A pneumatic actuator cylinder is used to pivot the moving plate relative to the machine frame. The moving plate supports the label applicator pad using a pneumatic rotary actuator (for rotating the pad between vertical and horizontal positions) and a pneumatic slide actuator (for extending and retracting the pad).

In one embodiment, the pad is provided with a vacuum cup at one end portion for ensuring complete separation from the label and a release liner. This vacuum cup is in addition to an array of vacuum openings spaced over the pad's surface. The vacuum cup can be used for very large labels or for labels that have a very aggressive adhesive. Thus, the vacuum cup can be positioned adjacent the output port of a conventional printer that generates printed labels having a rear adhesive surface and a release liner or backing.

The plasma coated tray can optionally be equipped with a source of air, preferably mounted under the tray for discharging air through slots in the tray to the upper surface of the tray. This source of air forms a "air float" under the labels to assist in preventing aggressive connection between the adhesive backing of the label and the plasma coated tray. Understandably, the flow rate of air through the slots and to the underside of the label is controlled so that a simple interface of air is formed between the label and the tray and not such a great quantity of air flow that the label is undesirably moved away from the tray prior to the time that it is picked up by the label applicator pad.

These objects and advantages of the present invention are accomplished more specifically by providing an apparatus for transferring a series of labels, each having opposing adhesive and printed sides to each of a plurality of articles being conveyed along a conveyor path on a moving conveyor belt, for example. The articles can includes cardboard boxes, box-like packages, cylindrical objects such as paint cans, pallets of bulky materials (dog food) stacked six packs of drinks, stacked cans of cleaning solution, and the like. Such palletized containers are commonly used by manufacturers to convey a host of products to the market place, each of these palletized containers being easily transportable within factories, between trucks and loading docks, etc. using a variety of forklifts. The present invention can be used to apply labels in sequence to such products notwithstanding the size or configuration of the package.

The apparatus of the present invention includes a printer for printing in sequence a plurality of pressure sensitive adhesive labels. Each label has an adhesive side and a printed side with printed matter thereon (for example bar code information) and each of the labels provides a release liner backing on the adhesive side. The printer preferably includes means for stripping the backing from the labels as they are printed. An output port on the printer discharges the label in sequence as each label has been printed and after its backing has been stripped. A label transfer surface holds each label after it is discharged from the printer. The transfer surface is preferably covered with a coating such as a plasma coating that allows the label to contact the plate but without substantial adhesion thereto, as with the present invention the adhesive side of the label faces the label transfer.

A label pickup pad is movably mounted with respect to a machine frame. The pickup pad includes a pad surface for engaging and lifting the label free from contact with the pickup point of the transfer surface. Thus, the label pickup pad makes contact with the printed side of the label. In order to securely hold the label to the pad, a vacuum source is supplied to the pad surface, the vacuum being preferably activated with a controller after the pickup pad is properly positioned to receive a label from the label transfer surface.

The label holding pad is movably supported by the frame between the pickup point and the articles, and in sequential fashion as the articles are conveyed along the conveyor path.

A controller can be used to control the timing of the transfer of labels from the printer to the pickup point, and for controlling the time of travel of the pad between the pickup point and each of the conveyed articles.

The present invention can move the label holding pad into multiple planes, including for example a horizontal plane when engaging a label from the label transfer surface and vertical planes when applying the label to the side of an article.

A feature of the present invention is that the label holding pad can apply labels to the side of a box being transferred or to the front or rear of a box being transferred, using the "flapper" to rotate the pad ninety degrees (90°) depending upon the surface to be engaged with the label. Thus, the present invention provides a system that can apply multiple labels to packages or boxes including the side and front, or the side and back of a box or article.

The pickup pad includes a pad member that comprises a pair of spaced apart mounting plates. The mounting plates of movable relative to one another between extended and retracted positions.

The mounting plates are supported at a desired fixed known distance apart in an extended position. One of the mounting plates carries the label holding pad, preferably a foam or like resilient pad, having holes therethrough for receiving the vacuum source.

The plurality of openings are thus spaced over the surface of the label holding pad as the pad is sized and shaped to conform generally to the labels being transferred and applied.

Spacers hold the mounting plates apart the said fixed distance. The spacers are preferably in the form of bolt and spring telescoping connections that allow the plates to move toward one another responsive to a compression applied to one of the mounting plates such as when the label holding pad applies a label to one of the articles being conveyed. Springs hold the plates apart in the extended position. When the pad assembly engages an article with a label, the spring tension is overcome allowing the two plates to move together.

A sensor senses this movement of the two plates toward one another indicating that the label has been applied. This sensor can then be used to return the pad to the original position at the pickup point so that the next label can be secured for application to the next package or article.

The present invention thus provides an improved method of applying a printed label to each article in a stream of conveyed articles travelling on a moving conveyor along the conveyor path.

With the method of the present invention, a plurality of pressure sensitive adhesive labels are generated, each having printed matter opposite the adhesive side of the label. The labels are discharged in sequence, for example, from an output port of a printer after printing the label with the printer.

The labels are then placed on a transfer surface, preferably with the label adhesive surface facing the transfer surface and with the printed side of the label facing away from the transfer surface. The label is then picked up from the pickup point with a moving label applicator that moves between a pickup point and a label application position spaced away from the pickup point.

The label applicator has a pickup pad with a surface that is generally sized and shaped to conform to the size and shape of the label.

A source of vacuum associated with the label applicator is used to hold the printed side of the label to the label applicator pad surface. The label applicator pad is then moved to a position adjacent one of the series of articles to be labeled that is travelling on the moving conveyor. The article is then contacted with the label applicator and the adhesive side of the label by engaging the article with the pad surface. The pad then returns to the pickup point when the next label is transferred to the pickup position.

With the present invention, the label can be selectively applied to a selected side of the article, such as a front or rear surface of the article, or one of the lateral sides of the article as the article is being conveyed along a conveyed path with a stream of articles that passes adjacent the apparatus.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
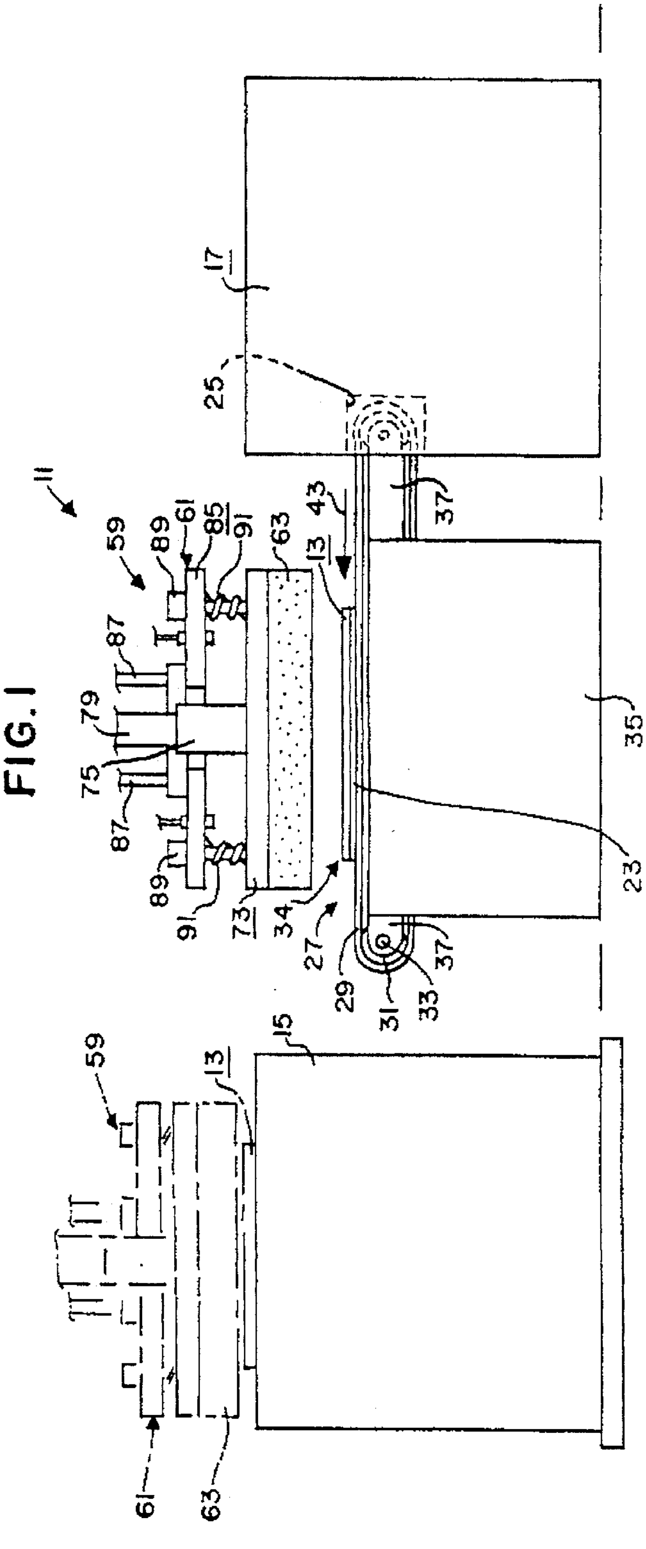
FIG. 1 is a somewhat diagrammatic side elevational view of the first embodiment of the label applicator of the present invention.
Figure 2:
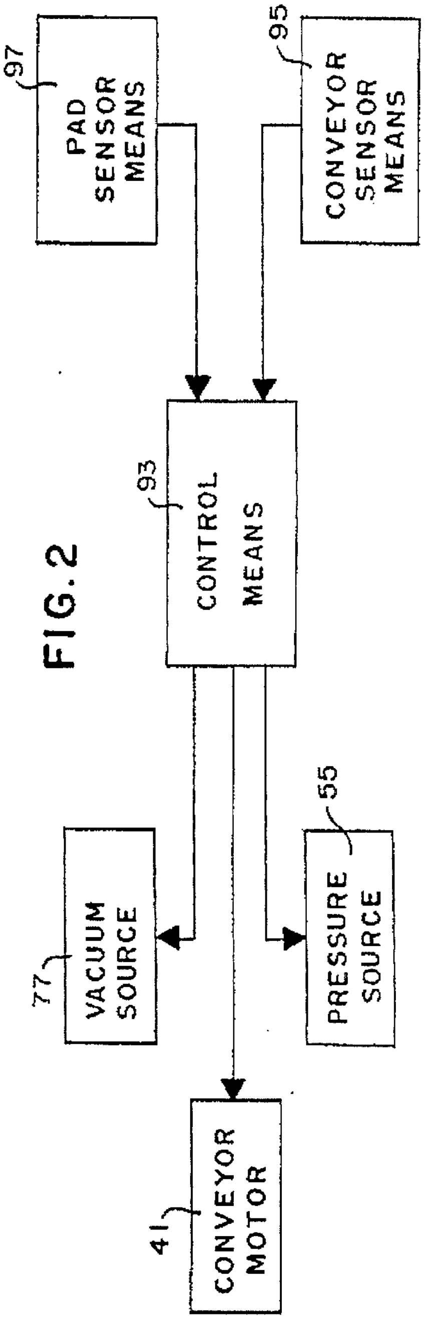
FIG. 2 is a block diagram of the control means of the first embodiment of the label applicator of the present invention.
Figure 3:
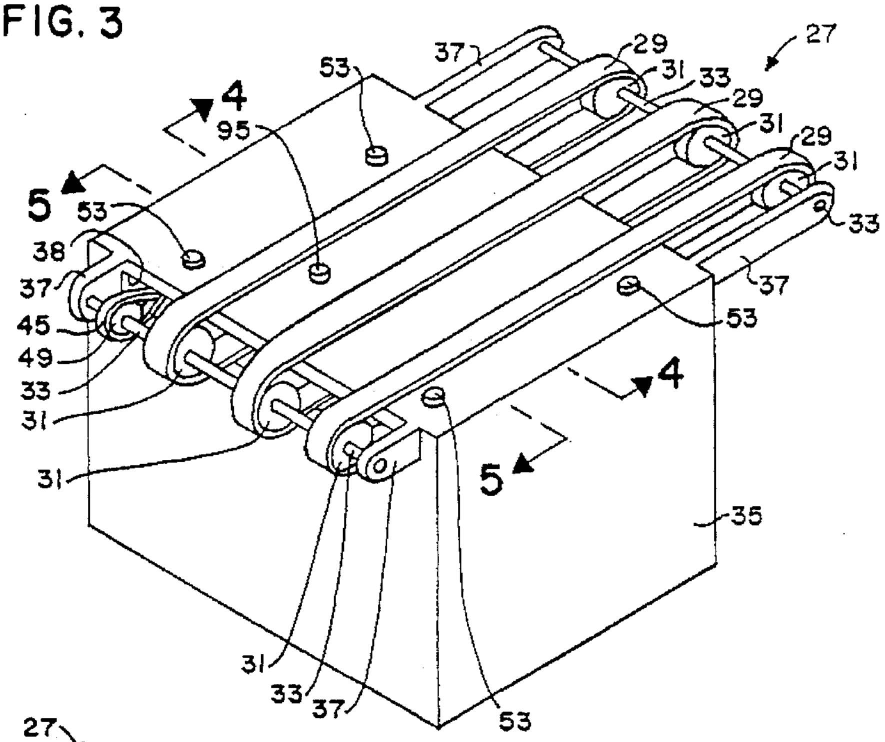
FIG. 3 is a perspective view of the label conveyor means of the first embodiment of the label applicator of the present invention.

The preferred embodiment of the label applicator apparatus of the present invention is shown diagrammatically in FIG. 1 and identified by the numeral 11. The label applicator 11 is used to apply pressure sensitive labels 13 to articles 15 and is used in combination with a typical pressure sensitive label printer 17. Each label 13 has a first or face side 19 having printed matter visible thereon, and a second or reverse side 21 having a pressure sensitive adhesive 23 thereon (see, in general, FIG. 4).

The label printer 17 may be a standard Intermec 86 series printer (e.g., an Intermec 8646 printer) or the like for printing the printed matter on the first side 19 of each label 13. The label printer 17 is preferably a self-stripping model. More specifically, pressure sensitive label printers typically utilize a plurality of blank labels that are mounted on a roll or strip of release material. After a label is printed, a self-stripping printer will strip or remove the printed label from the roll or strip of release material and expel the stripped, printed label through an output port 25 or the like as will now be apparent to those skilled in the art. However, a non-self-stripping label printer could be used in combination with a separate stripping mechanism as will now be apparent to those skilled in the art.

The label applicator 11 includes a label support 27 for receiving a label 13 from the label printer 17 with the pressure sensitive adhesive 23 of the label 13 resting on the label support 27. The label support 27 preferably includes a label support surface for allowing the label 13 to be temporarily secured thereto by the pressure sensitive adhesive 23 while allowing the label 13 to be easily removed therefrom without damage to the label 13 for subsequent application to the article 15.

The label support 27 includes a plurality of spaced apart belts 29. Each belt 29 is preferably an endless conveyor belt having a flat outer or support surface and trained about sheaves or pulleys 31 or the like. More specifically, the pulleys 31 are preferably supported by a pair of spaced apart axles 33 in such a manner so as to define a path of travel for the labels 13 from the output port 25 of the label printer 17 to a pickup point as indicated by the arrow 34 in FIG. 1. Axles 33 are preferably attached to a body member 35 by ears 37 or the like. The lower bight of the belts 29 may extend through slots 38 in the opposite ends of the body member 35 with the top bight of the belts located just above the top surface of the body member 35. The belts 29 may be adjustable in any manner now apparent to those skilled in the art to allow the tension of the belts 29 to be adjusted. At least the outer surface of the belts 29 is slick to prevent the pressure sensitive adhesive 23 of the labels 13 from forming a strong adherence thereto. More specifically, the belts 29 can be constructed from a slick plastic or the like so that the labels 13 can be removed therefrom without damage to the labels 13.

A motor drive 39 is provided for moving the labels 13 from the output port 25 of the label printer 17 to the pickup point 34. The drive 39 can include an electrical conveyor motor 41 coupled to the belts 29 in such a manner so as to cause the belts 29 to rotate in the direction indicated by the arrow 43 in FIG. 1. More specifically, the motor 41 is preferably coupled to one of the axles 33 by a drive belt 45 through a first pulley 47 attached to the drive shaft 48 of the motor 41 and a second pulley 49 attached to one of the axles 33 so that rotation of the drive shaft 48 of the motor 41 will cause the belts 29 to rotate in the direction indicated by the arrow 43 to thereby cause any label 13 supported on the belts 29 to move from the output port 25 of the label printer 17 to the pickup point 34.

Figure 4:
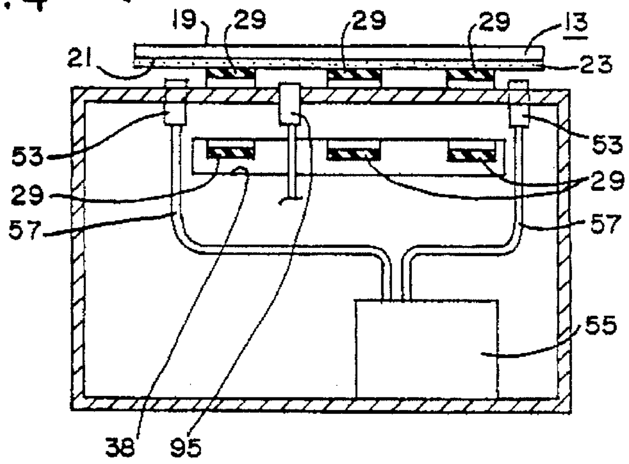
FIG. 4 is a sectional view substantially as taken on line 4—4 of FIG. 3 with certain parts omitted from clarity and with a label shown thereon in broken lines.
Figure 5:
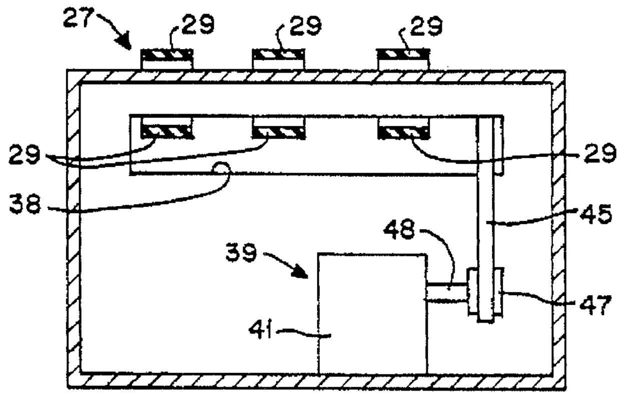
FIG. 5 is a sectional view substantially as taken on line 5—5 of FIG. 3 with portions thereof omitted for clarity.

The drive belt 45 may extend through one of the slots 38 in one end of the body member 35 as shown in FIG. 4. The speed at which the drive means 39 rotates the belts 29 is preferably substantially the same speed at which the label printer 17 discharges printed labels 13.

The label applicator 11 preferably includes a pressure source 51 for applying pressure to the second side 21 of a label 13 supported on the belts 29 when that label 13 reaches the pickup point 34 to urge that label 13 from the label support surface means (i.e., from the belts 29). The pressure source 51 can include air control jets 53 (e.g., a plurality of air jets or nozzles) for blowing air against the second side 21 of that label 13 adjacent the belts 29 to urge that label 13 upward from the belts 29. The pressure source 51 preferably supplies pressurized air to the air jets or nozzle 53. The pressure source 51 may include an electric air pump 55 or the like coupled to the air pressure jets 53 by tubing 57 or the like as will now be apparent to those skilled in the art.

The label applicator 11 includes a label transfer 59 for picking up a label 13 from the label support 27 and for applying that label 13 to the article 15. The label transfer 59 preferably includes a label grip means 61 for gripping the label 13. The label grip means 61 preferably includes a resilient pad member 63 having a first side 65 for engaging the first side 19 of the label 13, and having a second side 67.

A plurality of spaced apart apertures 69 preferably extend from the first side 65 of the pad member 63 to a manifold 71 formed by a plurality of channels which join each of the apertures 69 together to allow a vacuum to be evenly applied to each of the apertures 69. The pad member 63 is preferably constructed of sealed foam for providing a soft touch and for isolating each aperture 69 with vacuum. Thus, by applying a vacuum to the apertures 69 through the manifold 71, the label 13 can be picked-up and gripped by the first side 65 of the pad member 63 when the pad member 63 is placed in contact with the first side 19 of the label 13 as will now be apparent to those skilled in the art. The use of small, multiple apertures 69 keeps the label 13 from deforming when picked up by the pad member 63. The channels of the manifold 71 insure the even flow of vacuum to all apertures 69 and allow the label 13 to be picked up evenly and straight.

The label grip 61 preferably includes a first mounting plate 73 for being attached to the second side 67 of the pad member 63. The first mounting plate 73 is preferably constructed out of light weight aluminum and has a port 75 for being attached to a vacuum source 77 by a flexible pipe 79 or the like. The vacuum source 77 may include an electric vacuum pump, a non-mechanical pump, or the like coupled to the port 75 by the pipe 79.

The first mounting plate 73 preferably has a first side 81 and a second side 83. The second side 67 of the pad member 63 is preferably glued or otherwise attached to the second side 83 of the first mounting plate 73 with the manifold 71 communicating with the port 75 so that vacuum can be directed from the vacuum source 77, through the pipe 79 and port 75 to the manifold 71 and apertures 69.

Figure 6:
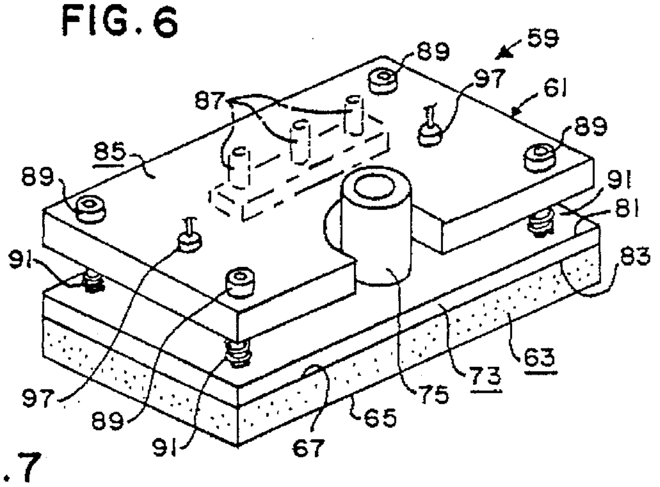
FIG. 6 is a perspective view of a label grip means of the first embodiment of the label applicator of the present invention with a portion of a transfer mechanism shown in broken lines.
Figure 7:
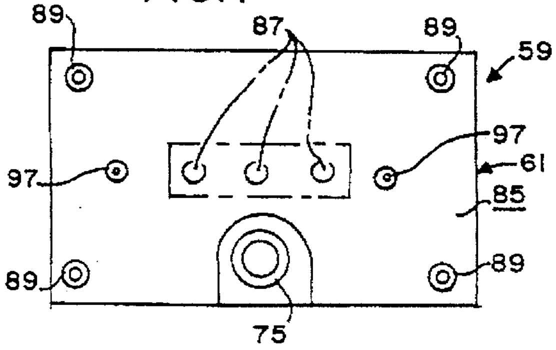
FIG. 7 is a top plan view of the label grip means of FIG. 6.
Figure 9:
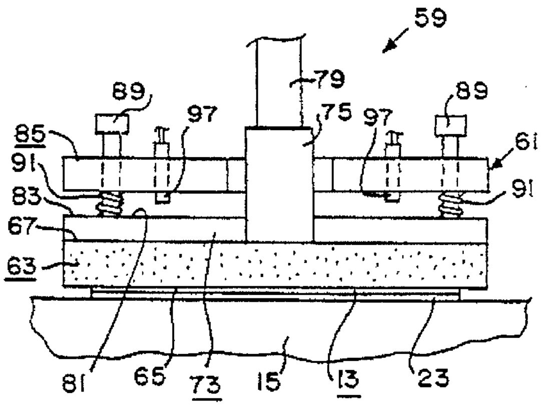
FIG. 9 is a bottom plan view of the label grip means of FIG. 6.
Figure 8:
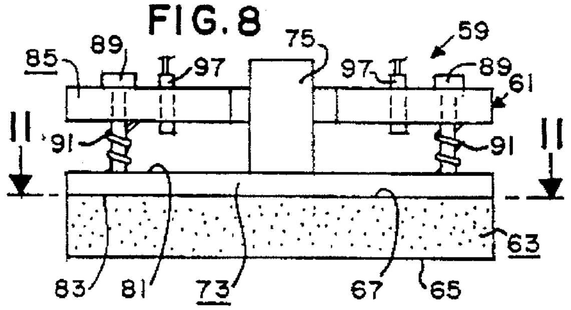
FIG. 8 is a side elevational view of the label grip means of FIG. 6.
Figure 10:
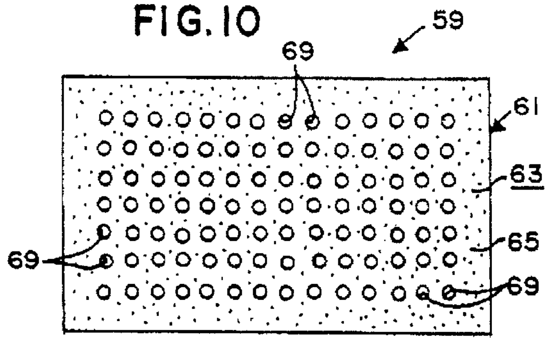
FIG. 10 is a side elevational view of the label grip means of FIG. 6 shown applying a label to an article.
Figure 11:
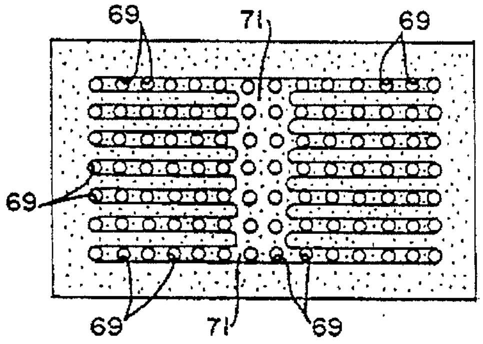
FIG. 11 is a sectional view substantially as taken on line 11—11 of FIG. 8.

The label grip 61 preferably includes a second mounting plate 85 for being movably attached to the first mounting plate 73 and for being attached to the actuator arms 87 or the like of a transfer mechanism of the label transfer means 59. The second mounting plate 85 is preferably constructed out of light weight aluminum for strength and support. The first and second mounting plates 73, 85 are preferably slidably attached to one another for allowing movement from a first or separated position as shown in solid lines FIGS. 1, 6 and 8 to a second or compressed position as shown in broken lines in FIG. 1 and in solid lines in FIG. 9 when the pad member 63 is pressed against an article 15. When an article 15 is engaged, shoulder bolts 89 preferably slidably extend through apertures between the first and second sides of the second mounting plate 85 adjacent each corner thereof and are fixedly attached to the first mounting plate 73. Coil springs 91 are provided about the shaft of each bolt 89 to normally urge the first and second mounting plates 73, 85 to the first or separated position and for controlling the movement of the mounting plates 73, 85 to the second or compressed position.

The transfer mechanism of the label transfer 59 may be of any specific type now apparent to those skilled in the art.

Thus, for example, the transfer mechanism could consist simply of manual means for allowing movement of the label grip means 61 but preferably includes automatic means for moving the label grip 61 from a first or home position to a second or label-pickup position for picking-up a label 13 from the pickup point 34 at the label support means 27, and then to a third or label-application position at the article 15. Thus, the specific construction and operation of such automatic transfer mechanism may vary widely as will now be apparent to those skilled in the art from relatively simple rotation and extension structures based on hydraulic or pneumatic cylinders (see, e.g. Karp, U.S. Pat. No. 4,367,118, issued Jan. 1983 and Treiber, U.S. Pat. No. 4,561,921, issued Dec. 31, 1985) to relative complex robotic arms which allows movement to many different axes, etc., as will now be apparent to those skilled in the art.

The label applicator 11 preferably includes control means 93 for controlling the operation of the pressure source 55 and the vacuum source 77, etc. The control means 93 may include a microprocessor. The label applicator 11 preferably includes a conveyor sensor 95 for determining when a printed label 13 is at the pickup point 34 and a pad sensor 97 for determining when the first and second mounting plates 73, 85 are in the second or compressed position. The conveyor sensor 95 may include a typical photo eye including an Omron E32-DC200 fiber optic cable and an Omron E3XR-CE4T sensor power supply for producing a signal when a label 13 reaches the pickup point 34.

The signal produced by the conveyor sensor means 95 may be used by the control means 93 to stop the label printer 17 and electric motor 41, to cause the transfer mechanism to move the label grip means 61 to the second or label-pickup position at the pickup point 34, to start the vacuum source 77, to start the pressure source 55, and to cause the transfer mechanism to the move the label grip means 61 with the label 13 secured thereto with its sticky side out to third or label-application position in a timed sequence, etc., whereby the label 13 will be grabbed and pickup by the label grip means 61 and subsequently pressed against the article 15 as will now be apparent to those skilled in the art.

Since the conveyor sensor 97 will continue to produce a signal in the event the label 13 is not picked up by the label grip means 61, the control means 93 can be programmed or designed to repeat the pickup process and to produce a system malfunction signal if the label 13 is not picked-up after a certain number of attempts, etc. When the label 13 is picked-up from the pickup point 34, the conveyor sensor means 95 produces a signal which may be used to start the label printer 17 and electric motor 41 so that a subsequent label 13 can be printed and conveyed to the pickup point 34 while the first label 13 is being applied to the article 15 to thereby provide a faster cycle time, etc. The pad sensor 97 may include typical photo eye including Omron E32-DC200 fiber optic cables and an Omron E3XR-CE4T sensor power supply for producing a signal when the first and second mounting plates 73, 85 move to the second, compressed position (i.e., when the pad member 63 presses a label 13 against an article 15). The signal produced by the pad sensor 97 may be used by the control means 93 to stop the vacuum source 77 and to cause the transfer mechanism to move the label grip 61 back to the first or home position.

The sensitivity of the pad sensor means 97 is preferably adjustable to allow for a wide range of sensitivity settings. The sensitivity adjustment can be set to apply labels 13 to very light or fragile article 15 without causing damage to the article 15. Additional sensors may be associated with the control means 93 for indicating the presence of an article 15, etc.

FIGS. 12–16 illustrate a second embodiment of the apparatus of the present invention designated generally by the numeral 100. Label applicator apparatus 100 includes a machine frame 101 that be supported with an underlying support 102 such as a machine shop floor, concrete base, table top or the like. The apparatus 100 can include a printer 103 which is a commercially available printer for printing in sequence pressure adhesive labels having a release backing and printed matter (for example bar code information) on the printed surface as with the first embodiment. Printer 103 discharges labels 13 from output 106 in sequence to tray 104. Tray 104 has a surface 105 that resists adhesion of the adhesive side of the label thereto.

In the second embodiment, tray 104 is constructed of an aluminum plate, for example, having a surface that resists adhesive connection of the adhesive side of the label thereto. The surface 105 is preferably a "plasma coated" surface such as a nickel chrome-type "plasma coated" surface. Such coatings can be applied to aluminum by Plasma Coatings, Inc. of Waterbery, Conn. and Plasma Coatings of Tenn., Inc. of Memphis, Tenn. Such plasma coatings are commercially available and described in more detail by the specification sheets that are published by Plasma Coatings, Inc. entitled "Specialty Coatings Series". Tray 104 includes a plurality of slots 107–109 that can respectively receive air flow (slots 107, 108) or an electric eye 109 for purposes of sensing when a label 13 has been applied to surface 105 of tray 104.

Figure 12:
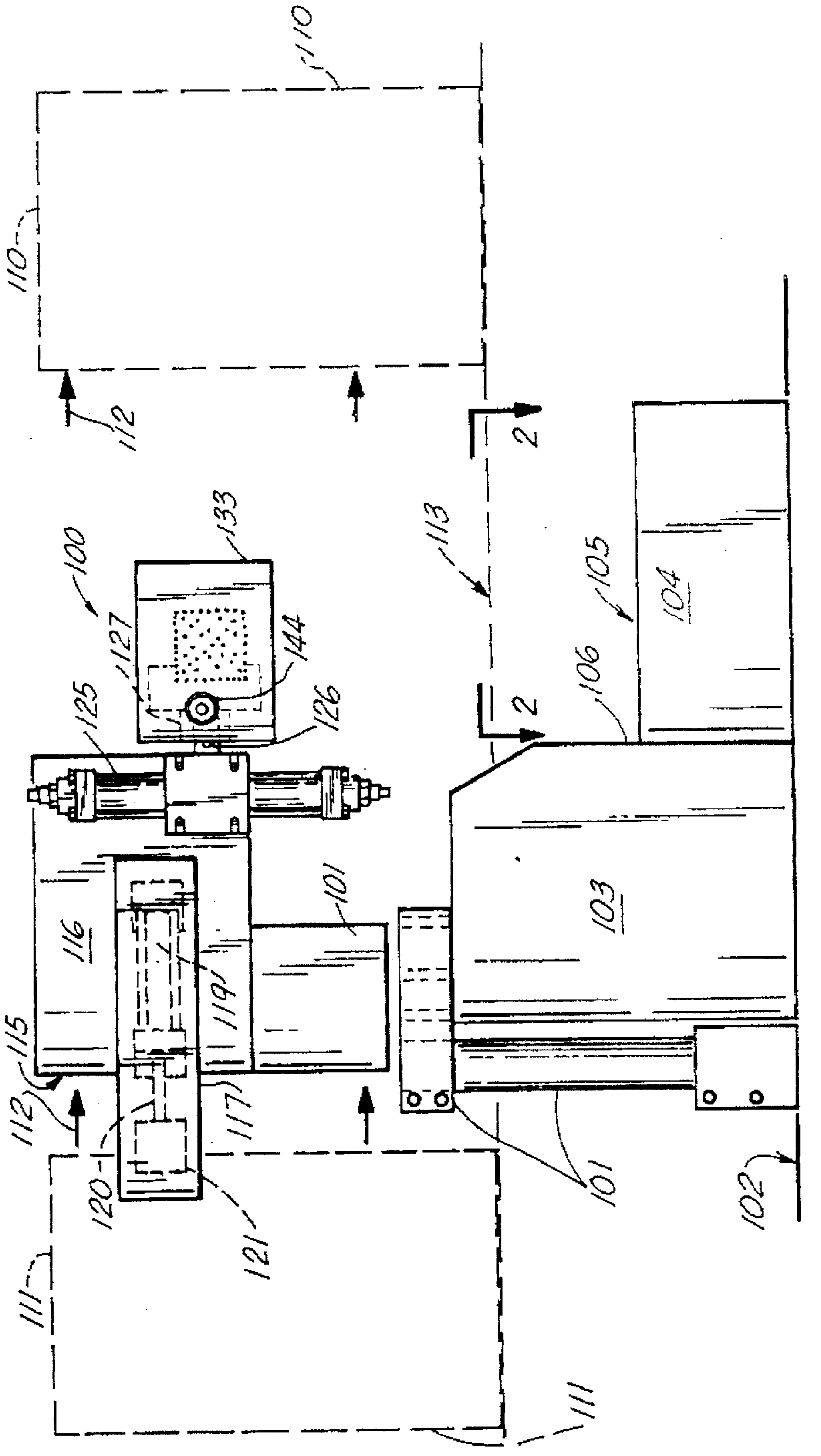
FIG. 12 is an elevational view of a second embodiment of the apparatus of the present invention.
Figure 13:
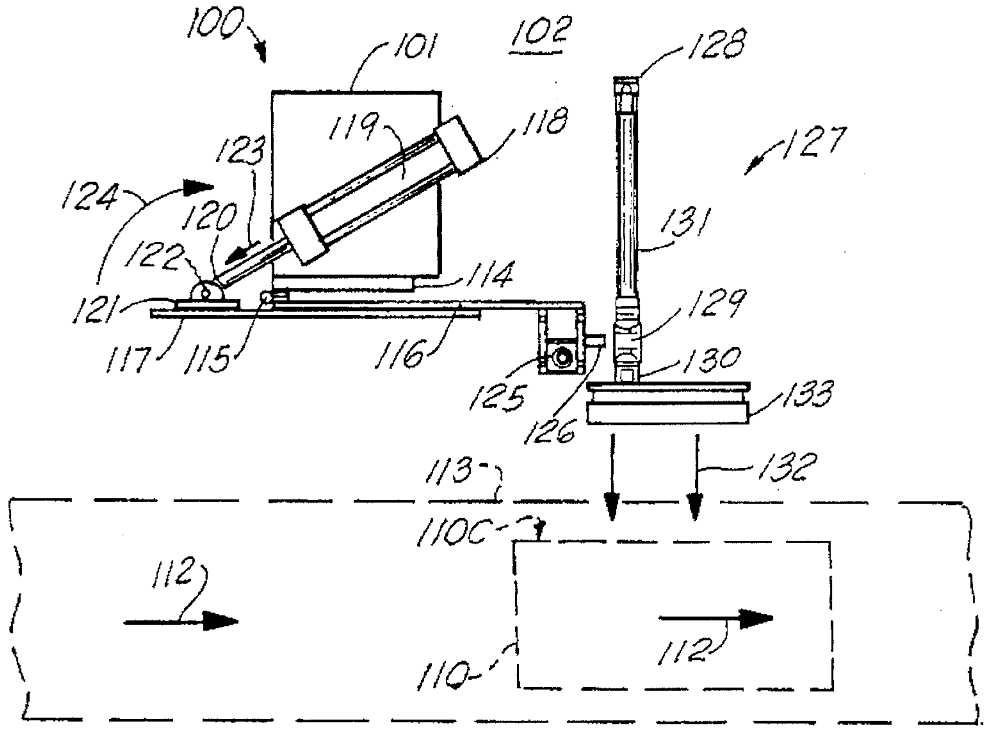
FIG. 13 is a sectional view taken along lines 13—13 of FIG. 12.
Figure 14:
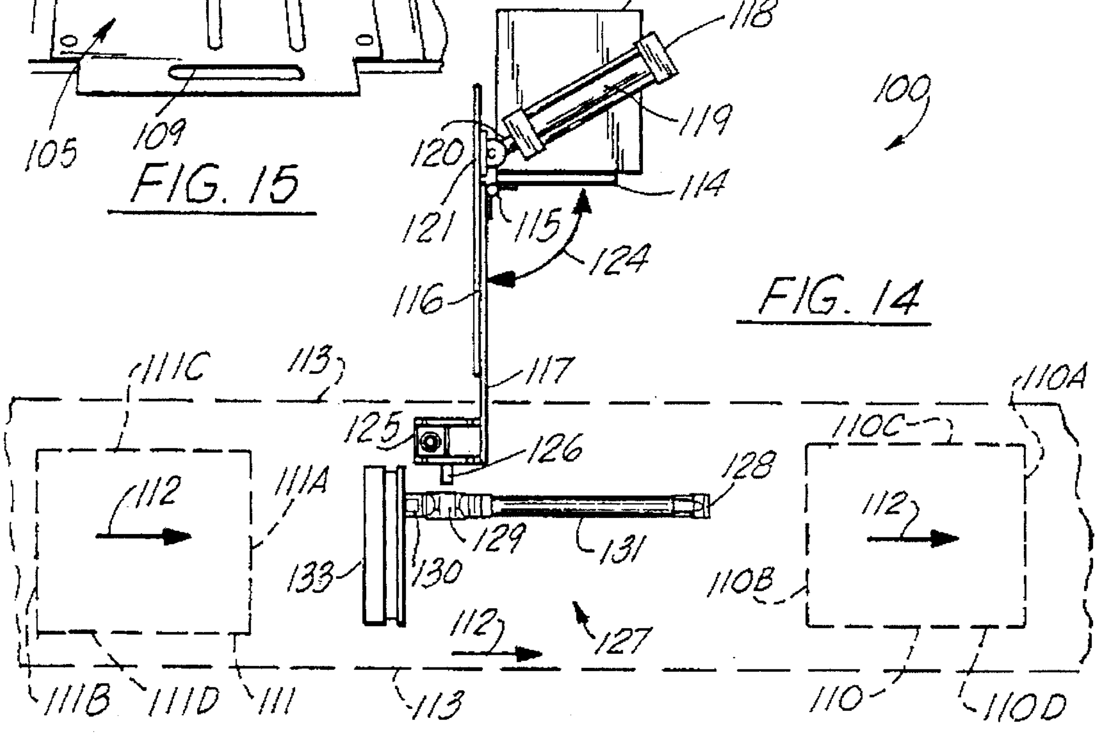
FIG. 14 is a top plan view of the second embodiment of the apparatus of the present invention showing the label applicator in the position for applying a label to the side of an article being conveyed.

In FIGS. 12–14, a conveyor 113 such as a typical moving conveying belt is shown conveying a plurality of articles such as boxes 110, 111 and in the direction of arrows 112.

With the present invention, labels can be applied to any vertical and/or horizontal surface of boxes 110, 111 including the vertical front panels 110A, 111A, vertical rear panels 110B, 111B, or either of the vertical side panels of boxes 110, 111 designated as 110C, 111C and 110D, 111D.

The application of labels to either side of boxes 110, 111 (and additional boxes conveyed on conveyor 113) is accomplished by moving the pad 133 into preferably three different planes.

In the first plane, the pad 133 can be rotated to a generally horizontal position for engaging the surface 105 when picking up a label. The second plane is shown in FIG. 13, which is a vertical plane parallel to the side panels 110C, 110D, and 111C, 111D of boxes 110, 111. In FIG. 14, the third plane is shown wherein the pad 133 is in a vertical plane that is parallel to the front panels 110A, 111A, and rear panels 110B, 111B of boxes 110, 111.

The pad 133 can move into multiple planes by virtue of a "flapper" arrangement formed by static plate 114, hinge 115, and pivoting plates 116. Rotary actuator 125 can be used to rotate the pad 133 between vertical and horizontal positions.

In FIGS. 12–14, static plate 114 is mounted to machine frame 101. Hinge 115 forms a connection between static plate 114 and pivoting plate 116. Pivoting plate 116 is generally rectangular as shown in FIG. 12. Pivoting plate 116 carries lever arm 117.

An extensible member 118 forms a connection between machine frame 101 and lever arm 117. The extensible member 118 can be, for example, a pneumatic cylinder that includes cylinder 119 and pushrod 120.

Attachment plate 121 forms a connection to lever arm 117. A pinned connection 122 forms a connection between pushrod 120 and attachment plate 121.

Arrow 123 in FIG. 13 schematically illustrates an extension of pushrod 120 relative to cylinder 119. Curved arrow 124 in FIGS. 13 and 14 illustrates the movement of pivoting plate 116 between a first position (FIG. 13) wherein the plate 116 abuts and is generally parallel to the static plate 114. This places pad 133 generally parallel to the side panels 110C, 111C of boxes 110, 111.

In FIG. 14, moving plate 116 has rotated about pivot 115 to a position which places pad 133 parallel to the front panels 110, 111 of each box 110, 111 being conveyed on conveyor 113.

Moving plate 116 carries rotary actuator 125 and slide 127. Rotary actuator 125 is a commercially available actuator such as a rack and pinion type, pneumatically controlled actuator. Actuator 125 includes a rotary shaft 126 that forms a connection to the fixed section 129 of slide 127. The slide 127 includes a fixed section 129 and a sliding section 131. The sliding section 131 has a first end 128 spaced away from pad 133 and a second end 130 adjacent pad 133. Slide 127 can be a pneumatically operated slide that moves the sliding section 131 in the direction of arrows 132 between extended and retracted positions.

In FIGS. 13 and 14, slide 131 is in the retracted position which places end 130 of slide 131 adjacent fixed section 129. In order to apply a label 13 to side 110C of box 110, the apparatus 100 is oriented in the position shown in FIG. 13. In this position, the extensible member 118 has extended its pushrod 120 in the direction of arrow 123 to align pivoting plate 116 with fixed plate 114. The pneumatic slide actuator 127 is then operated to move the second end 130 away from fixed section 129 and in the direction of arrows 132 until the pad 133 engages side 110C of box 110.

Figure 15:
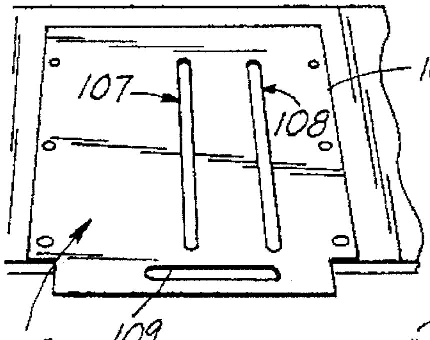
FIG. 15 is a top plan view of the second embodiment of the apparatus of the present invention showing the label applicator in a position for applying the label to either the front or rear of an article being conveyed.

In order to apply a label to a selected front panel 111A, 111B, or a selected rear panel 110B, 111B of a box 110, 111, a user positions the apparatus 100 in the position shown in FIG. 15. In this position, the rotary actuator 125 can be used to position the pad 133 in the position shown in FIG. 14 for applying a label to the front panel 111A of a box 111. Alternatively, the pad 113 can be rotated one hundred eighty degrees (180°) with actuator 125 for applying a label to the rear 110B of box 110. In FIG. 14, extensible member 118 has been operated to withdraw pushrod 120 as shown so that the moving or pivoting plate 116 has pivoted ninety degrees (90°) away from fixed plate 114 as shown by arrow 124.

In order to pick up a label 13 from surface 105, the pad 133 is rotated using the rotary actuator 125 from the vertical position shown in FIG. 12 ninety degrees (90°) until the pad 133 is in a horizontal position. The slide 127 is then operates to move the end 130 away from fixed section 129 of slide 127 until the pad 133 reaches the label 13 placed on tray surface 105.

Figure 16:
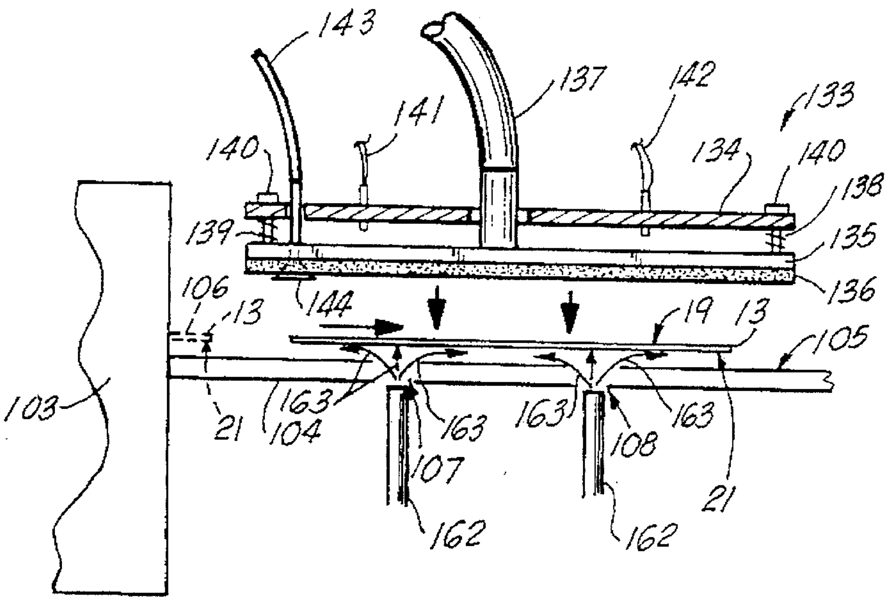
FIG. 16 is a fragmentary sectional view of the second embodiment of the apparatus of the present invention illustrating the label transfer tray and label holding pad portions thereof.

FIGS. 12 and 16 show a second embodiment of the pad, designated as 133 in the FIGS. Pad 133 includes a rear mounting plate 134 and a front mounting plate 135 supported parallel to plate 134. The front mounting plate 135 carries a label holding pad 136 that can be of foam, and constructed in accordance with the preferred embodiment (FIGS. 6–11), providing an array of openings thereon and a manifold for receiving vacuum via vacuum source 137. However, the embodiment of FIG. 17 adds a second vacuum source in the form of a suction cup 144. The suction cup 144 receives its own vacuum source via vacuum line 143. Suction cup 144 can be used to assist in the removal of a label 13 from its release liner when very large labels 13 are used or if the adhesive between the label and the release liner is a very agressive adhesive.

The connection between plates 134, 135 can be as with respect to the preferred embodiment, using a plurality of telescoping connections using bolts 138 and coil springs 139 so that the plates 134, 135 can move together when an article 110, 111 is engaged. The telescoping bolt 138 and spring 139 arrangement can include bolts 138 having an enlarged head 140. Bolts 138 are attached rigidly to plate 135 and pass through openings in plate 134. The heads 140 are larger than the diameter of openings in plate 134 while the shank of each bolt 138 is slightly smaller than the openings in plate 134. Coil springs 139 thus hold the plates apart in an extended position. However, when the label applicator pad 133 presses its label 13 against an article 110, 111, pad 136 and mounting plate 135 compress toward the plate 134 to define a collapsed or retracted position.

Sensors 141, 142 can be used to determine when such a collapsing of the plates 134, 135 together has occurred thus sensing that a label 13 has been applied to the desired article, such as boxes 110 or 111. As with the preferred embodiment of FIGS. 1–11, such a sensing can be used to then reverse direction of the pad 133 for returning it to the label pickup point at surface 105.

Air jets 162 can be used to transmit air through slots 107, 108 to the underside 21 (adhesive side) of label 13. This air flow is a controlled air flow as shown by the arrows 163 in FIG. 16. The air flow 163 is relatively small, sufficient to provide a thin layer of air between the surface 105 and the adhesive surface 21 of label 13, thus preventing of an agressive adhesive connection being formed between label 13 and tray 104.

In FIGS. 17–20, a third embodiment of the label applicator pad portion of the apparatus of the present invention is shown, designated by the numeral 145. In FIGS. 17–20, label applicator pad 145 includes a rear mounting plate 146, a front mounting plate 147, and a label holding pad 148 such as foam pad that is affixed to the plate 147 as with the preferred embodiment. The plate 147 and pad 148 can be constructed as with the preferred embodiment of FIGS. 6–11, having a plurality or array of openings 160 thereon and a manifold that communicates with vacuum source 149 for supplying vacuum to the openings 161.

Figure 17:
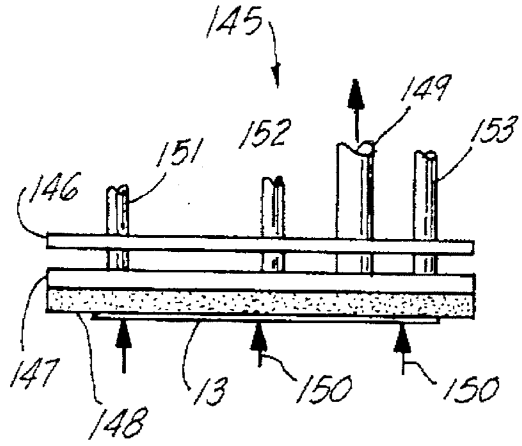
FIG. 17 is a schematic sectional fragmentary view of a third embodiment of the apparatus of the present invention.
Figure 18:
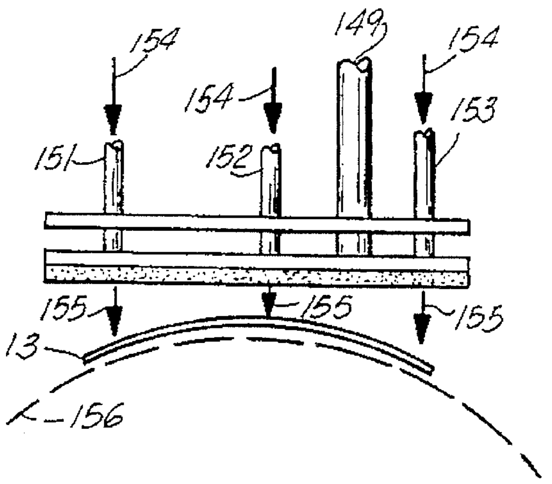
FIG. 18 is a schematic sectional fragmentary view of a third embodiment of the apparatus of the present invention.
Figure 19:
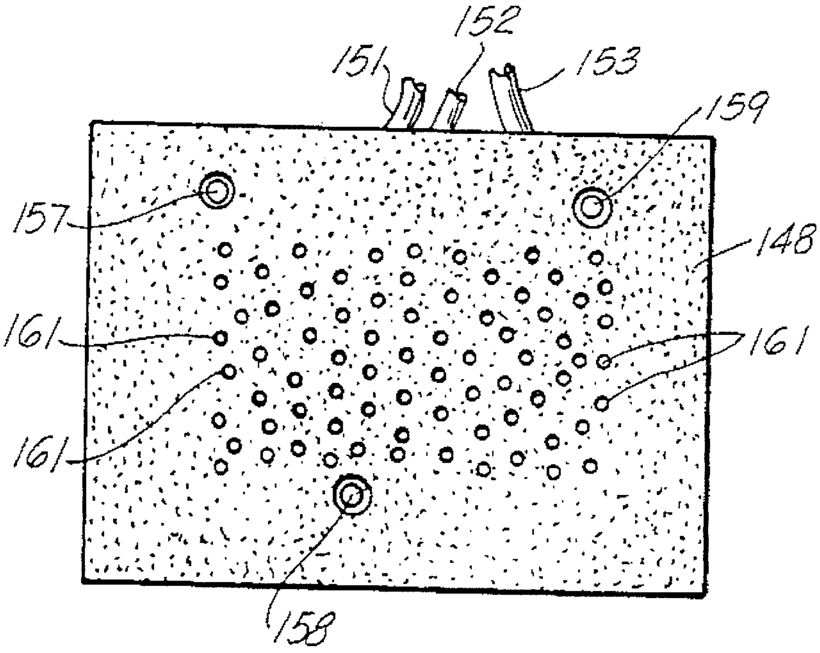
FIG. 19 is front, elevational fragmentary view of the third embodiment of the apparatus of the present invention.
Figure 20:
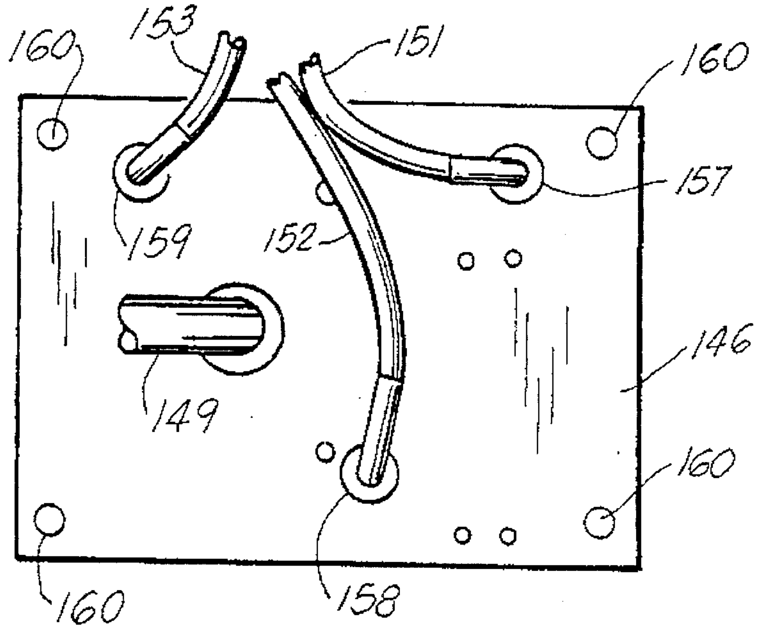
FIG. 20 is a rear, fragmentary elevational view of the third embodiment of the apparatus of the present invention.

The embodiment of FIGS. 17–20 provides an improvement that assists in the complete application of a label 13 to an irregularly shaped article such as a cylindrical can 156, for example, as shown in FIG. 18. In FIG. 17, arrows 150 indicate a holding of label 13 to pad 148 with the vacuum source 149. A plurality of conduits 151–153 provide pressurized air to a plurality of air jets 157–159 respectively. The air jets 157–159 are activated at the same time that the vacuum source 149 is deactivated, namely when a label is to be discharged from the pad 148 to the article 146.

As shown in FIG. 18, when the vacuum 149 has been deactivated, air is transmitted under pressure via conduits 151, 153, schematically indicated by the arrows 154. Arrows 155 schematically indicate the flow of pressurized air through air jets 157–159 and to the printed side 19 of label 13. This ensures a force of pressurized air against the printed side 19 of the label 13 for wrapping the label around articles such as curved or cylindrical articles 156, as shown in FIG. 18. As with the preferred and second embodiment, telescoping bolt 158 and spring 159 assemblies arrangements 160 can be used for forming a connection between the plates 146–147. The following table lists the parts numbers and parts descriptions as used herein and in the drawings attached hereto.

PARTS LIST

| Part Number | Description |
|---|---|
| 11 | label applicator apparatus |
| 13 | pressure sensitive label |
| 15 | article |
| 17 | label printer |
| 19 | first side |
| 21 | second side |
| 23 | adhesive |
| 25 | output port |
| 27 | label support |
| 29 | belt |
| 31 | sheave |
| 33 | axles |
| 35 | body member |
| 37 | ear |
| 38 | slot |
| 39 | motor drive |
| 41 | electrical motor |
| 43 | arrow |
| 45 | drive belt |
| 47 | first pulley |
| 48 | drive shaft |
| 49 | second pulley |
| 51 | pressure source |
| 53 | air jets |
| 55 | pump |
| 57 | tubing |
| 59 | label transfer |
| 61 | label grip |
| 63 | resilient pad |
| 65 | first side |
| 67 | second side |
| 69 | operative |
| 71 | manifold |
| 73 | first mounting plate |
| 75 | port |
| 77 | vacuum source |
| 79 | pipe |
| 81 | first side |
| 83 | second side |
| 85 | second mounting plate |
| 87 | actuator arm |
| 89 | shoulder belt |
| 91 | coil spring |
| 93 | control means |
| 95 | conveyor sensor |
| 97 | pad sensor |
| 100 | label applicator apparatus |
| 101 | machine frame |
| 102 | underlying support |
| 103 | printer |
| 104 | tray |
| 105 | plasma coated surface |
| 106 | output port |
| 107 | slot |
| 108 | slot |
| 109 | slot |
| 110 | box |
| 110A | front panel |
| 110B | rear panel |
| 110C | side panel |
| 110D | Side panel |
| 111 | box |
| 111A | front panel |
| 111B | rear panel |
| 111C | side panel |
| 111D | side panel |
| 112 | arrow |
| 113 | moving conveyor belt |
| 114 | static plate |
| 115 | hinge |
| 116 | pivoting plate |
| 117 | lever arm |
| 118 | extensible member |

-continued

PARTS LIST

| Part Number | Description |
|---|---|
| 119 | cylinder |
| 120 | pushrod |
| 121 | attachment plate |
| 122 | pinned connection |
| 123 | arrow |
| 124 | curved arrow |
| 125 | rotary actuator |
| 126 | rotary shaft |
| 127 | slide |
| 128 | first end |
| 129 | fixed section |
| 130 | second end |
| 131 | sliding section |
| 132 | arrows |
| 133 | label applicator pad |
| 134 | rear mounting plate |
| 135 | front mounting plate |
| 136 | label holding pad |
| 137 | vacuum source |
| 138 | telescoping bolt |
| 139 | coil spring |
| 140 | head |
| 141 | sensor |
| 142 | sensor |
| 143 | vacuum line |
| 144 | suction cup |
| 145 | label applicator pad |
| 146 | rear mounting plate |
| 147 | front mounting plate |
| 148 | label holding pad |
| 150 | arrow |
| 151 | conduit |
| 152 | conduit |
| 153 | conduit |
| 154 | arrow |
| 155 | arrow |
| 156 | cylindrical object |
| 157 | air jet |
| 158 | air jet |
| 159 | air jet |
| 160 | telescoping bolt |
| 161 | vacuum openings |
| 162 | air jets |
| 163 | arrows |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for transferring a series of labels each with opposing adhesive and printed sides to each of a plurality of articles being conveyed, along a conveyor path comprising:

a) a printer for printing in sequence a plurality of pressure sensitive adhesive labels, each label having an adhesive side and a printed side with printed matter thereon each of the labels having a release liner backing on the adhesive side, the printer having means for stripping the backing from the labels as they are printed;

b) an output port on the printer for discharging labels in sequence as each label has been printed, and after its backing has been stripped;

c) label transfer means for transferring labels from the output port to a pickup point, the transfer means including a transfer surface with means thereon for contacting without substantial adhesion thereto, the adhesive side of the label;

d) label pickup pad means that includes a label holding pad with a pad surface for lifting a label free from contact with the pickup point by engaging the printed side of the label;

e) vacuum means for applying a vacuum to the pad surface when the label holding pad is positioned to receive a label from the label transfer means;

f) the label holding pad being movably supported by the frame to move sequentially between the pickup point and the articles as the articles are conveyed along the conveyor path; and g) control means for controlling the timing of the transfer of labels from the printer to the pickup point and the travel of the pad between the pickup point and each of the conveyed articles.

2. The apparatus of claim 1 wherein the transfer means includes a tray having a surface for receiving the adhesive side of the label.

3. The apparatus of claim 1 wherein the label transfer means includes a tray with a non-stick surface thereon.

4. The apparatus of claim 1 wherein the label transfer means includes a tray with a generally flat horizontal surface with a non-stick surface thereon.

5. The apparatus of claim 1 wherein the label transfer means includes a metallic tray with a nickel chrome based coating thereon.

6. The apparatus of claim 2 wherein the tray has an opening therein, and further comprising air jet means for applying a cushion of air via the slot to the adhesive side of the label.

7. The apparatus of claim 6 wherein the tray has a plurality of opening therein, one of the openings having a sensor for determining when a label has been deposited on the tray.

8. The apparatus of claim 1 wherein said pickup pad means comprises:

a moving pickup pad member that includes a pair of spaced apart mounting plates that are movable relative to one another between extended and retracted positions, said plates being supported at a desired known fixed distance apart in said extended position, one of the plates carrying said label holding pad;

a plurality of openings spaced over the surface of the label holding pad;

spacer means for holding the mounting plates apart said fixed distance, said spacer means allowing the plates to move toward one another responsive to compression applied to one of said mounting plates such as when the label holding pad member applies a label to one of the articles when a label has been deposited on the tray; and spring means for urging the plates into said extended position.

9. The apparatus of claim 8 further comprising sensor means for indicating when the plates are compressed together.

10. The apparatus of claim 8 wherein the spacer means comprises a plurality of telescoping posts extending between the plates.

11. The apparatus of claim 8 wherein the printer has means for stripping the release liner from the label prior to a discharge of the label from the printer.

12. The apparatus of claim 8 wherein the label applicator is movable between the pickup position and either of two separate, spaced apart labeling positions.

13. The apparatus of claim 8 wherein the label applicator means includes a sensor that enables the applicator means to reverse directions upon contacting one of the objects to be labeled.

14. The apparatus of claim 8 wherein the label applicator means includes touch sensitive means for halting movement of the applicator means when it contacts one of the objects to be labeled.

15. The apparatus of claim 8 wherein the label applicator has a resilient pad surface with an array of openings on its pad surface and the vacuum source communicates with the array of openings.

16. The apparatus of claim 15 further comprising a suction cup on the pad surface spaced from the array of openings.

17. The apparatus of claim 8 wherein the control means includes sensors for determining when a printed label is at the pickup point.

18. The apparatus of claim 8 wherein the control means includes sensors that return the label applicator to the pickup point when a printed label has been placed at the pickup point.

19. The apparatus of claim 8 wherein the control means includes sensors that signal for the label applicator to move to the package and press the label against the package when the package reaches a preselected position.

20. The apparatus of claim 8 wherein the control means includes sensors that determine when the label has been pressed against the article by the label applicator, and responsive thereto, moves the label applicator away from the article.

21. A label applicator apparatus for applying printed labels having an adhesive backing to each of a stream of articles being conveyed along a path, comprising:

a) printer means for printing a stream of successive printed labels, each label having a printed side and an adhesive side;

b) transfer means for sequentially positioning each label adjacent the printer means;

c) a machine frame positioned adjacent the printer means;

d) a label pickup pad that is movably supported by the frame between a first pickup position and multiple selected applicator positions;

e) the multiple applicator positions including a second position of the label pickup pad that applies the label to an article surface defining a first plane and a third position of the label pickup pad that applies the label to an article surface defining a second plane that forms an angle with the first plane;

f) the combination of the printer means and transfer means defining means for positioning the label with the adhesive surface facing the label pickup pad when the pickup pad is in the first pickup position;

g) the pad having means for sensing when the pad and an attached label have engaged an article; and h) control means for moving the pad between the pickup and applicator positions.

22. The label applicator apparatus of claim 21 wherein in the first and second planes from an angle of about 90°.

23. The label applicator apparatus of claim 21 wherein the first and second planes form an angle of 90°or less.

24. The label applicator apparatus of claim 21 wherein the label pickup pad defines a plane that is generally horizontal in the first, "pickup" position.

25. The label applicator apparatus of claim 21 wherein the label pickup pad defines a plane that is generally horizontal in the first "pickup" position, and the said first plane and second planes are each substantially vertical planes.

26. The label applicator apparatus of claim 21 wherein the label pickup pad defines a generally horizontal plane in the first pickup position that is generally perpendicular to the said first and second planes.

27. The label applicator apparatus of claim 21 wherein the label pickup pad occupies three separate planes when the label pickup pad moves respectively between the first "pickup" position and the second and third positions, each of the planes being generally perpendicular to the other two planes.

28. The label applicator apparatus of claim 21 further comprising blow-off means carried by the pad for aiding in a transfer of the label from the label pickup pad to one of the articles being conveyed, said blow-off means including at least one air jet for discharging air between the label and the label pickup pad.

29. The label applicator apparatus of claim 21 further comprising air jet means associated with the transfer means for forming a layer of air in between the label and transfer means after the label has been discharged from the printer and before the label has been picked up by the label pickup pad.

30. The label applicator apparatus of claim 21 wherein the label pickup pad is mounted on a slide arm that reciprocates between extended and retracted positions.

31. The label applicator apparatus of claim 21 further comprising a moving plate supported by the frame, a hinge forming an interface between the moving plate and the frame so that the moving plate rotates about the hinge and wherein the label pickup pad travels with the moving plate.

32. The label applicator apparatus of claim 21 further comprising:

an extensible cylinder mounted on the frame;

a moving plate pivotally mounted to the frame;

the extensible cylinder having cylinder body and a push-rod portion that extends and retracts with respect to the cylinder body;

the end portions of the cylinder body being mounted respectively to the frame and to the moving plate, so that extension and retraction of the cylinder and push-rod relative to one another rotates the moving plate about the hinge; and rotary means carried by the moving plate for rotating the pad between generally horizontal and generally vertical positions.

33. The label applicator apparatus of claim 21 further comprising:

an extensible cylinder mounted on the frame;

a moving plate pivotally mounted to the frame;

the extensible cylinder having cylinder body and a push-rod portion that extends and retracts with respect to the cylinder body;

the end portions of the cylinder body being mounted respectively to the frame and to the moving plate, so that extension and retraction of the cylinder and push-rod relative to one another rotates the moving plate about the hinge;

rotary means carried by the moving plate for rotating the pad between generally horizontal and generally vertical positions; and further comprising a slide for extending and retracting the pad, the slide being attached to the rotary means.

34. A method of applying a printed label to each article in a stream of conveyed articles travelling on a conveyor path comprising the steps of:

a) generating a plurality of labels with a label printer, each label having an adhesive face;

b) printing printed matter on a face of the label opposite the adhesive face;

c) discharging labels in sequence from an output port of the printer after printing the label with the printer;

d) placing each label that is discharged from the output port on a transfer surface;

e) wherein in step "d" the label adhesive surface faces the transfer surface;

f) picking up the label from the pickup point with a moving label applicator that moves between the pickup point and a label application position spaced away form the pickup point and wherein the label applicator has a pickup pad with a pad surface that is generally sized and shaped to conform to the size and shape of the label;

g) using a source of vacuum associated with the label applicator to hold the printed side of the label to the label applicator so that the adhesive side of the label does not adhere to the label applicator;

h) moving the label applicator and the label picked up to a position adjacent one of a series of articles to be labeled and travelling on the moving conveyor;

i) contacting the article with the label applicator and the adhesive side of the label by engaging the article with the pad surface;

j) returning the pad surface of the label applicator to the pickup point when the next label is transferred from the printer output port to the pickup position;

k) selectively applying the label to a selected side of the article, the selected sides including one side that is generally parallel to the conveyor path and one side that is generally perpendicular to the conveyor path.

35. The method of claim 34 wherein each label has a release liner covering the adhesive face and in step "c" the release liner is stripped away before the label is discharged from the output port.

36. The method of claim 34 further comprising the step between steps "i" and "j" of initiating a return of the label applicator by compressing the label applicator upon engagement of the article.

37. The method of claim 34 wherein step "a" comprises the step of generating a plurality of labels in sequence, each with a printed surface, an opposed adhesive surface and a release liner covering the adhesive surface.

38. The method of claim 34 further comprising the step between steps "c" and "d" of stripping the release liner from the adhesive side of the liner.

39. The method of claim 34 further comprising the step of conveying the series of articles on a moving conveyor.

40. The method of claim 34 further comprising the step of blowing air against the adhesive side of the label after the label is placed on the transfer surface.

41. The method of claim 34 further comprising the step of blowing air against the printed side of the label as the label is applied to each article.

42. The method of claim 34 further comprising the step of determining when the transfer surface has a label with a sensor.

43. The method of claim 34 further comprising the step of moving the pickup pad surface into at least three different planes during the steps "f" through and including "i".

44. The method of claim 35 further comprising the step of moving the pickup pad surface into at least three different planes during the steps "f" through and including "i", including at least one generally horizontal plane and at least one generally vertical plane.

45. The method of claim 34 further comprising the step of moving the pickup pad surface into at least three different planes during the steps "f" through and including "i", including one generally horizontal plane and two generally vertical planes.

46. The method of claim 34 further comprising the step of moving the pickup pad surface into at least three different planes during the steps "f" through and including "i" including one generally horizontal plane, and two generally vertical planes that form an angle of about ninety degrees or less.

47. The method of claim 34 further comprising the step of moving the pickup pad surface into at least three different planes during the steps "f" through and including "i" including one generally horizontal plane, and two generally vertical planes that form an acute angle.

48. The method of claim 35 further comprising the step of moving the pickup pad surface into at least three different planes during the steps "f" through and including "i" including one generally horizontal plane, and two generally vertical planes that form an angle of about ninety degrees.

49. A method of applying a printed label to each article in a stream of conveyed articles travelling on a moving conveyor along a conveyor path comprising the steps of:

a) placing each label in sequence on a transfer surface that has a pickup point;

b) wherein in step "a" the label adhesive surface faces the transfer surface;

c) picking up the label from the pickup point with a moving label applicator that moves between the pickup point and a label application position spaced away form the pickup point and wherein the label applicator has a pickup pad with a pickup surface that is generally sized and shaped to conform the size and shape of the label;

d) using a source of vacuum associated with the label applicator to hold the printed side of the label to the label applicator so that the adhesive side of the label does not adhere to the label applicator;

e) moving the label applicator and the label picked up to a position adjacent one of a series of articles to be labeled and travelling on the moving conveyor;

f) contacting the article with the label applicator and the adhesive side of the label by engaging the article with the pickup surface of the pad;

g) returning the pickup surface of the label applicator to the pickup point when the next label is transferred from the printer output port to the pickup position;

h) selectively applying the label to a selected side of the article, the selected sides including one side that is generally parallel to the conveyor path and one side that is generally perpendicular to the conveyor path.

50. The method of claim 49 wherein each label has a release liner covering the adhesive face further comprising the step of separating the release liner from the label.

51. The method of claim 49 further comprising the step between steps "f" and "g" of initiating a return of the label applicator by compressing the label applicator upon engagement of the article.

52. The method of claim 49 further comprising the step of generating a plurality of printed labels in sequence, each with a printed surface, an opposed adhesive surface and a release liner covering the adhesive surface.

53. The method of claim 49 further comprising the step generating a plurality of printed labels in sequence, each with a printed surface that includes a bar code and an opposed adhesive surface.

54. The method of claim 49 further comprising the step of conveying the series of articles on a moving conveyor.

55. The method of claim 49 further comprising the step of blowing air against the adhesive side of the label after the label is placed on the transfer surface.

56. The method of claim 49 further comprising the step of blowing air against the printed side of the label as the label is applied to each article.

57. The method of claim 49 further comprising the step of determining when the transfer surface has a label with a sensor.

58. The method of claim 49 further comprising the step of moving the pickup pad surface into at least three different planes during the steps "c" through and including "f".

59. The method of claim 49 further comprising the step of moving the pickup pad surface into at least three different planes during the steps "c" through and including "f", including at least one generally horizontal plane and at least one generally vertical plane.

60. The method of claim 49 further comprising the step of moving the pickup pad surface into at least three different planes during the steps "c" through and including "f", including one generally horizontal plane and two generally vertical planes.

61. The method of claim 49 further comprising the step of moving the pickup pad surface into at least three different planes during the steps "c" through and including "f" including one generally horizontal plane, and two generally vertical planes that form an angle of about ninety degrees or less.

62. The method of claim 49 further comprising the step of moving the pickup pad surface into at least three different planes during the steps "c" through and including "f" including one generally horizontal plane, and two generally vertical planes that form an acute angle.

63. The method of claim 49 further comprising the step of moving the pickup pad surface into at least three different planes during the steps "c" through and including "f" including one generally horizontal plane, and two generally vertical planes that form an angle of about ninety degrees.

* * * * *

UNITED STATES PATENT AND TRADEMARK OFFICE

CERTIFICATE OF CORRECTION

PATENT NO. : 5,540,795

DATED : July 30, 1996

INVENTOR(S) : Richard D. Franklin

It is certified that error appears in the above-identified patent and that said Letters Patent is hereby corrected as shown below:

Title page, item [75] Inventors: should read as follows:

--[75] Inventors: Richard D. Franklin, Germantown; Robert Franklin, Memphis; Robert H. McQuage, Memphis; Terrence D.Watson, Memphis; Phillip M. Williams, Germantown, all of Tenn.--.

Signed and Sealed this

Eleventh Day of February, 1997

Attest:

BRUCE LEHMAN

*Attesting Officer*

*Commissioner of Patents and Trademarks*